United States Patent [19]

Giroux

[11] Patent Number: 4,810,837

[45] Date of Patent: Mar. 7, 1989

[54] CLASP FOR FIXING AN ELECTRICAL WIRE TO AN INSULATOR AND METHOD OF FIXATION

[76] Inventor: Pierre R. Giroux, 1515 Papineau Street, Trois-Riviéres, Canada, G8Z 4H7

[21] Appl. No.: 151,649

[22] Filed: Feb. 2, 1988

[51] Int. Cl.[4] ........................ H01B 17/22; H02G 1/04

[52] U.S. Cl. ........................................ 174/172; 29/252; 29/428

[58] Field of Search ........................ 174/168, 169, 172; 29/428

[56] References Cited

U.S. PATENT DOCUMENTS 448,956 3/1891 Graham et al. .................... 174/172

FOREIGN PATENT DOCUMENTS 2319546 11/1974 Fed. Rep. of Germany ...... 174/168

*Primary Examiner*—Laramie E. Askin

[57] ABSTRACT

A clasp for fixing an electrical wire to an insulator having a saddle portion and a method of doing so. The clasp includes a resilient but bendable clamp, having attached to its inner surface a wire gripper element, made of a semi-conductor elastomeric material. The method of fixation involves the use of a power device associated with mechanical parts adapted to carry out a series of simple steps, including the steps of lifting the electrical wire into the gripper, and applying pressure to close the gripper around the wire while simultaneously securing the clamp to the saddle portion of the insulator.

9 Claims, 3 Drawing Sheets

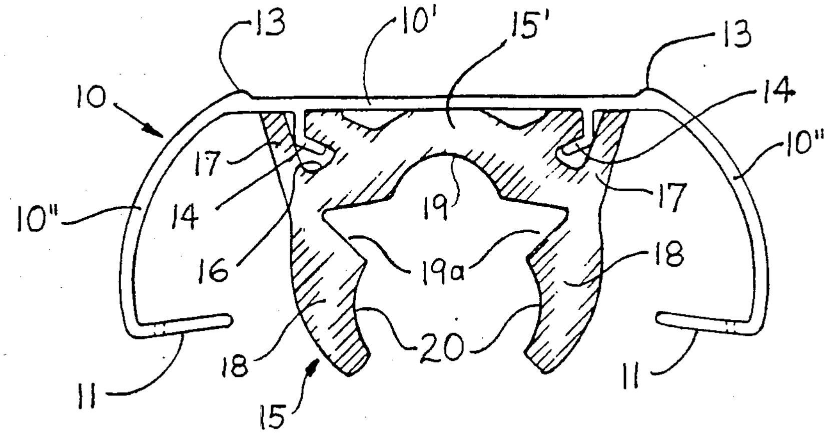
Fig.2
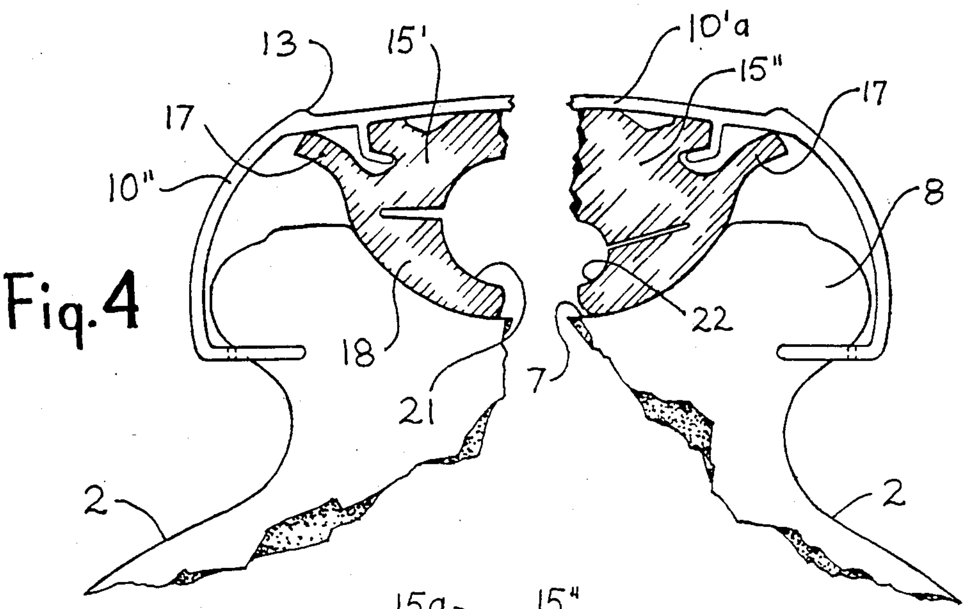
Fig.4
Fig.4a
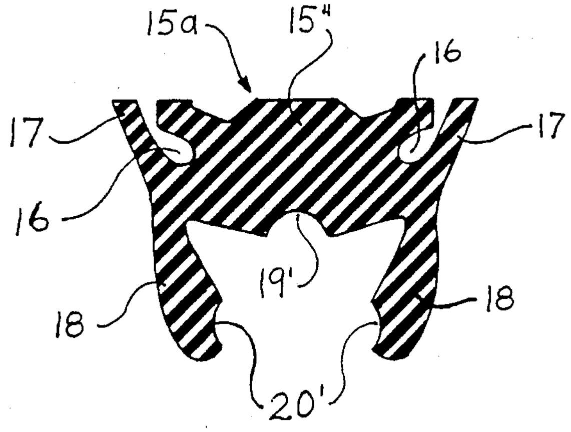
Fig.3

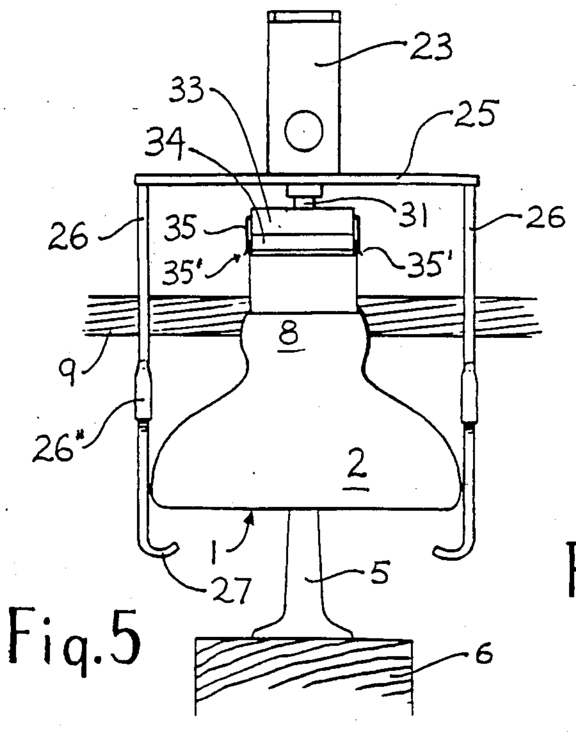
Fiq.5
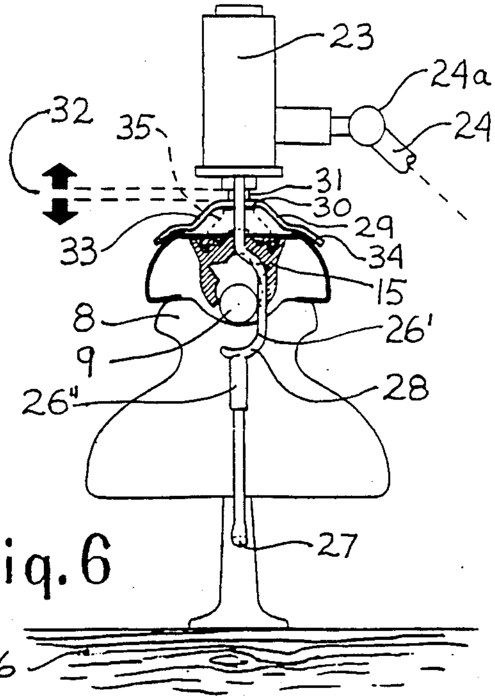
Fiq.6
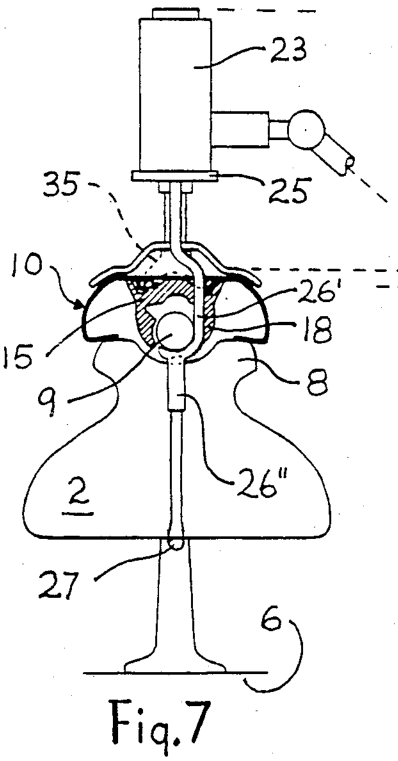
Fiq.7
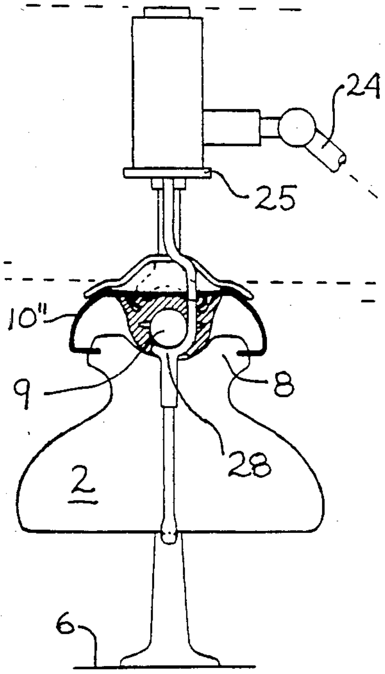
Fiq.8
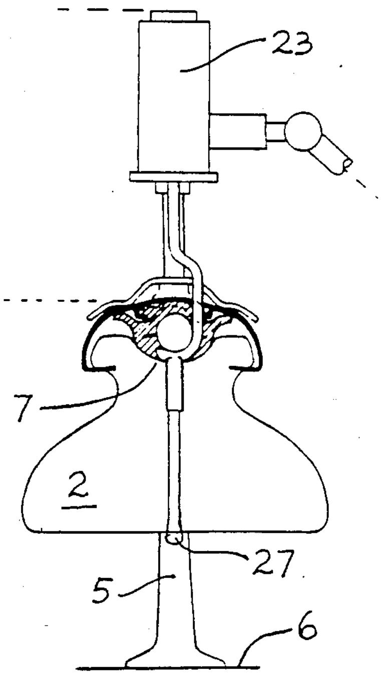
Fiq.9

CLASP FOR FIXING AN ELECTRICAL WIRE TO AN INSULATOR AND METHOD OF FIXATION

FIELD OF THE INVENTION

The present invention relates to a clasp for fixing an electrical wire to a pin type insulator and to a method of attaching an electrical wire to a pin type insulator by means of the clay.

BACKGROUND OF THE INVENTION

Insulators are used on utility poles and towers to prevent electricity flowing through wires, frequently at a very high voltage, from being discharged to the ground or other wires.

A typical pin type insulator is fixed to a pole or tower crosspiece and has an upper saddle portion on which the wire rests. Till now, most commonly a wire has been attached to its insulator by manually winding and twisting a small diameter wire around the electrical wire and the saddle portion.

Such method and means of attachment is unsatisfactory for four reasons:

(1) it is difficult for a workman who must also climb or be hoisted to live wires in a crane bucket, to effect the tricky winding of the small diameter wire, using a tool with a six-foot insulated pole;

(2) it is time-consuming;

(3) such means of attachment does not prevent the electrical wire from slipping away over the insulator in the event that the wire is severed, for example, by a falling tree, in a windy storm, such being possible because the utility poles or towers are usually quite far apart from each other, resulting in relatively heavy lengths or suspended wire between insulators, and thus, if a wire is broken, its weight will tend to pull downwardly and across an insulator against the wound small diameter wire; and (4) tie-wires are known to cause radio interference of the AM band.

OBJECTS OF THE INVENTION

In view of the above, it is a first object of the present invention to provide a clasp and method for fixing a wire to an insulator which obviates the above-mentioned disadvantages.

It is another object of the present invention to provide a clasp and method of the character described, which is simple in design and includes easy steps to install on an insulator.

It is a further object of the present invention to provide a clasp of the character described, which is noncostly to manufacture.

SUMMARY OF THE INVENTION

The above and other objects and advantages of the present invention are realized according to a preferred embodiment by a clasp comprised of a clamp made of rigid but bendable material and a gripper element. The clamp has a flat, upper portion and a means at each end adapted to positively grasp the saddle portion of an insulator, as will be explained. The clamp is adapted to be positioned directly over the insulator and clamped to the same. Within the clamp is a wire-gripping element which is made of a yieldably-deformable material, such as a suitable elastomer. The element consists of a main body portion including a generally flat upper surface. The undersurface of the body portion has a lengthwise-extending first groove. Both sides of the gripper element are preferably formed with an attachment means to attach the gripper element to the clamp. Both sides of the gripper element further have lengthwise-extending first walls projecting preferably slightly outwardly. These first walls each merge with the body portion. Second downwardly-extending walls also project from the body portion.

The inner lower extremity of each second wall has a lengthwise-extending second groove.

During fixation, the two second walls are deformed inwardly from their initial configuration to a fully-permanent folded configuration, where the three grooves define a bore of a circular cross-section, adapted to firmly grip an electrical wire therein. Such deformation of the second walls is assisted by the initially straight first walls which abut against the lower surface of the clamp. Simultaneously, the clamp is rigidly fastened to the insulator.

It is within the scope of the present invention to achieve such attachment of an electrical wire to an insulator saddle portion by having recourse to a hand-tool connected to an arrangement of mechanical parts adapted to perform a series of steps.

The mechanical parts are comprised of a pair of spacedapart legs joined together by a lengthwise yoke member, the latter being in turn attached to an expansible ram mechanism.

Each leg has a lowermost first hook means adapted to grip the lower edge of an insulator and further has a second hook means adapted to catch and lift an electrical wire extending over the saddle portion of the insulator.

Secured to the expansible ram mechanism is a press means adapted to push downwardly against the clamp and cause the lifting action of the second hook means and the locking action of the first hook means.

The method of securing the electrical wire to its insulator may therefore be briefly indicated as follows:

(a) the gripper element is attached to the clamp by its attachment means;

(b) the clasp is attached manually directed to the press means of the tool and positioned over the insulator saddle portion, with the first and second hook means under the insulator and the electrical wire, respectively;

(c) the ram is actuated to lift the hook means and cause the press means to exert downward pressure on the clamp and gripper element, until the clasp holds the electrical wire and is securely fastened to the insulator; and (d) the tool is removed.

BRIEF DESCRIPTION OF THE DRAWINGS

The above will be more clearly understood by having referral to the preferred embodiments of the invention, illustrated by way of the accompanying drawings, in which:

FIG. 2 is an end view of a clamp and one embodiment of a gripper element for a given wire size;

FIG. 3 is a cross-sectional view of another embodiment of a gripper element for a smaller wire size;

FIGS. 4 and 4*a* are views of half-clasps, half the upper portion of an insulator and half of the first and second embodiments of the gripper, respectively; the grippers being in fully-closed configuration;

FIG. 5 is a lateral elevation of an insulator, a segment of electrical wire to be attached thereto, and of the tool and clasp positioned over the insulator;

FIGS. 6 is an end view at right angle to and corresponding to FIG. 5; and

FIGS. 7 to 9 are further sequential end views illustrating the method used to effect installation of the clasp.

DETAILED DESCRIPTION OF THE PREFERRED EMBODIMENTS

Figure 1:
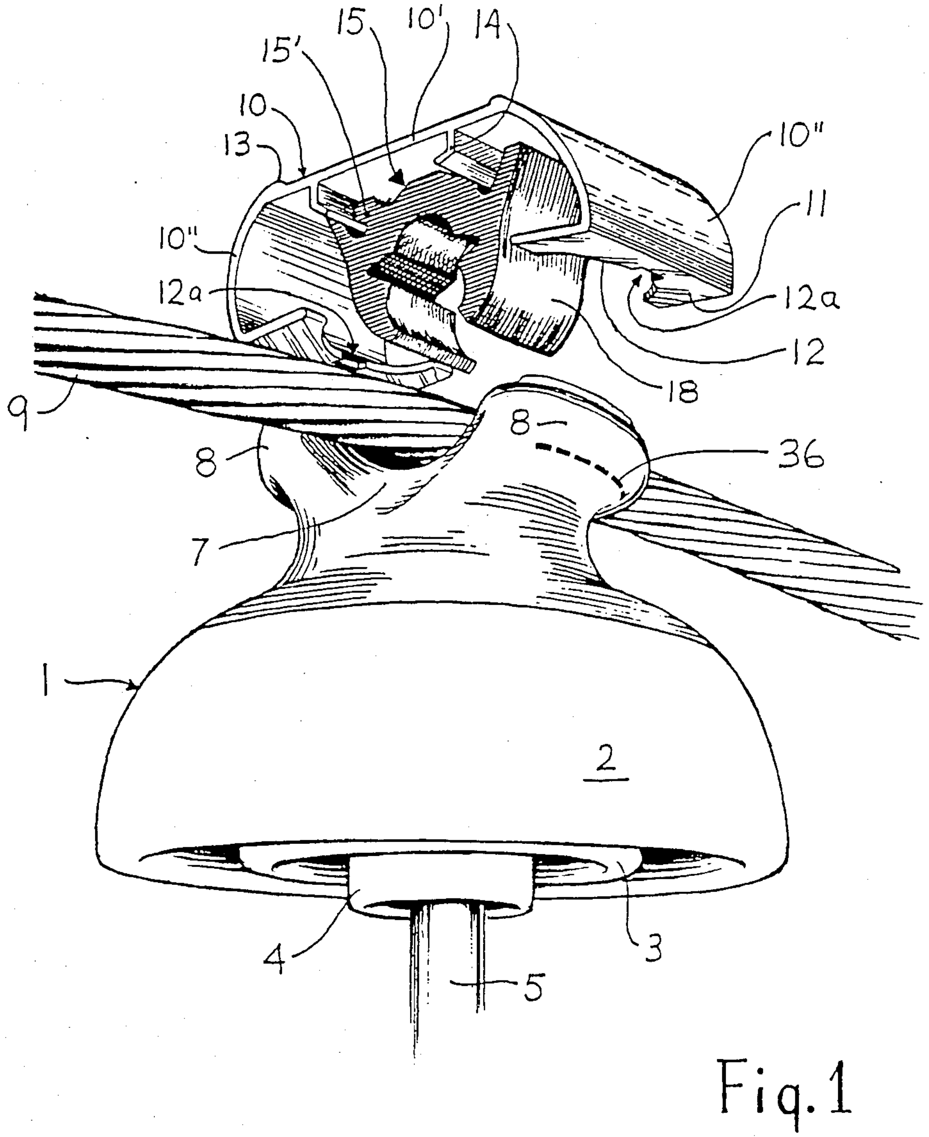
FIG. 1 is a perspective view of a clasp according to the invention, prior to installation, also showing an insulator and a segment of an electric wire or cable.

Referring firstly to FIG. 1, there is shown a typical, conventional insulator 1, made out of an electrically-insulating material, such as porcelain. Insulator 1 is formed with a lower skirt portion 2, of generally frustum shape, including a pair of concentric base portions 3, 4, the smaller of which is rigidly attached to a support post 5, the latter being in turn attached to a cross-piece 6 (as seen in FIG. 5) of a utility pole or tower (not shown). The upper portion of insulator 1 has the general shape of a transverse saddle including a central arcuate cradle 7 and jutting parts 8.

The saddle is adapted to support a lengthwise-extending electrically-charged wire or cable 9.

FIGS. 1, 2, and 4 show a clamp 10 according to the invention. It is preferably made from an extrusion of aluminum cut to length and machined. It includes a flat portion 10′ merging with downwardly-curved portions 10″ at both its ends. Each portion 10″ is bent horizontally inwardly at its lower end to define a flange 11, having an innermost semi-circular recess 12. Portion 10″, flanges 11, and recesses 12 constitute the grasp means. Each recess 12 has a central notch 12*a*. Clamp 10 has a lengthwise-extending exterior ridge 13 at each merging of arcuate portions 10″ with flat portion 10′. The interior surface of clamp 10 is provided with a pair of lengthwise-extending L-shape flanges 14, which are more closely spaced than ridges 13.

A wire gripper element 15 is adapted to be used complementarily with clamp 10. Element 15 is made of yieldably-deformable, essentially, electrically-partly-conducting elastomeric material, such as rubber with a carbon content. The initial shape of element 15 is preferably formed by an extrusion process after which a piece of desired length may be easily cut.

Element 15 has a main body portion 15′, the top surface of which has a pair of transversely-spaced L-shape furrows 16, as clearly shown in FIGS. 2 and 3. Furrows 16 constitute an attachment means adapted to receive flanges 14, so that the gripper element 15 can be secured to clamp 10, as shown.

Each furrow 16 defines a contiguous angularly-outwardly-projecting first wall 17. Walls 17 merge with body portion 15′.

Also merging with body portion 15′ are a pair of second walls 18. Each of the latter is located below each adjacent first wall 17 and generally in alignment therewith.

The middle of the undersurface of body portion 15′ is formed with a lengthwise-extending first groove 19, in the general cross-sectional shape of a semi-circle. Groove 19 is flanked on each side by a V-shaped notch 19*a*.

The lower inner extremities of both second walls 18 are provided with a second groove 20 in the general shape of a quarter-circle.

The gripper 15*a* of the second embodiment is similar, except as to dimensions, including a smaller groove 19′ and grooves 20′ and a thicker portion 15″.

It will be clear from a perusal of FIGS. 2, 3, 4, and 4*a* that the two walls 18 are adapted to be bent inwardly from an initial configuration, shown in FIGS. 2 and 3, to a permanently-bent installed configuration, as in FIGS. 4 and 4a. In the latter configuration, the first groove 19 or 19′ and the two second grooves 20 or 20′ form a bore 21, 22, respectively, of circular cross-section and of a size to grippingly, frictionally retain a wire 9. The latter may, of course, be of varying diameter, as suggested in the figures. The outer surface of curvature of the exterior of both second walls 18 is identical to the arc of curvature of the arcuate cradle 7 on both sides of the latter, as shown.

Referring now to FIGS. 5 to 9 inclusive, the method of using clamp 10 and gripper element 15 is illustrated, along with a tool used to carry out the method.

FIGS. 5 and 6 show power means consisting of a spring-return cylinder and piston ram 23, which is securely attached to a hand-held handle 24 by a universal connector 24*a*. Handle 24 is held by an operator in a crane bucket or the like (not shown). Expansion force, such as hydraulic pressure, can be delivered to ram 23 through a tube running within or along handle 24 with operating levers on the latter.

Ram 23 is made integral with a transverse, horizontal yoke member 25. Each of the opposite ends of yoke 25 carries a downwardly-projecting leg 26. The lower ends of legs 26 carry an inwardly-oriented hook 27, constituting a first hook means, as clearly shown in FIG. 5. Hooks 27 are adapted to catch the bottom edge of the skirt 2 of insulator 1.

Intermediate the upper and lower ends of legs 26 are transversly- outwardly-bent portions 26′ having lowermost hook rests 28, the latter constituting a second hook means.

Immediately below hook rests 28, each leg 26 may be made with an enlarged hollow portion 26″. Portions 26″ are internally threaded so that the complementarily-threaded upper ends of the lower portions of legs 26 can be length-adjusted by screwing such lower portions of the legs into portions 26″. Thus, the distance between hooks 27 and 28 of each leg 26 may be adjusted to suit different sizes of insulators.

Completing the tool is a press means comprised of a rigid press plate 29, having a flat mid-area 30, which is rigidly secured to the remote end of ram piston rod 31, the latter being adapted for vertical movement, as suggested by the arrows 32 in FIG. 6. Mid-area 30 is merged on both its sides with transversely- outwardly-downwardly-projecting portions 33, in turn merging with endmost transversely- outwardly-projecting shoulders 34.

Shoulders 34 are adapted to contact and press against the respective ridges 13 of clamp 10.

Press plate 29 incorporates, at both ends, guiding and clasp-retaining flange 35, with an outwardly-flared lower end 35′.

The clasp is installed as follows:

(a) gripper element 15 or 15*a* is attached to clamp 10 by sliding flanges 14 into furrows 16 until the element 15 is directly underneath top wall 10′ or clamp 10;

(b) the clamp 10 is pressed against press plate 29 and retained by guiding and retaining flange 35;

(c) using handle 24, gripper element 15 or 15*a* is carried to and positioned over cable 9 with flanges 11 of the clamp 10 resting on the respective jutting parts 8 of insulator 1, and, thus, as seen in FIG. 6, the electrical wire 9 partially engages between the two second walls 18 of gripper 15 and yoke 25 then extends lengthwise of wire 9 and legs 26 project down on each side of insulator 1 with lower and upper hooks 27, 28 ready to upwardly engage the bottom edge of wire 9 firstly and insulator 1 secondly;

(d) the piston rod 31 of ram 23 is actuated downwardly, thus lifting ram 23 and resulting in two things: hook rests 28 engage and lift wire 9, so that it clears the necessary space between it and the cradle 7 to allow insertion therein of the two second walls 18 of gripper 15; and hooks 27 engage insulator 2;

(e) piston rod 31 is further actuated, as in FIGS. 8 and 9, thereby exerting downward force against clamp 10 and gripper element 15 with wire 9 firmly held above cradle 7 of insulator 1; press plate 29 pushes against clamp 10 by its shoulders 34 acting on ridges 13 and as such action continues (see FIG. 8), second walls 18 are forced to follow the contour of cradle 7 and bend inwardly under wire 9, such being obtained because each wall 18 is initially aligned with its associated wall 17 (see FIG. 2) which effectively transmits a pushing force; then first walls 17 are gradually splayed outwardly, relieving unwanted force from being exerted upwardly against the distal ends of portion 10', notches 19a permitting this closure, (the final shape of gripper 15 is shown in FIGS. 9, 4, and 4*a*); and occuring simultaneously with the deformation of gripper element 15 is the movement of flanges 11 around and underneath jutting parts 8 due to the bendable quality of clamp 10 at its weakest central portion, whereby recesses 12 finally are locked under jutting parts 8, as suggested by the dashed line 36 in FIG. 1, and because the downward push is exerted on the spaced ridges 13, flat portion 10' is bent and, therefore, the fully-installed configuration of clamp 10 includes a slightly-convex shape 10'*a* of flat portion 10' (see FIGS. 4 and 4*a*) to more firmly retain clamp 10 on insulator 1; and (f) ram 23 is operated in reverse direction to clear hooks 27 and 28 from skirt 2 and wire 9; and ram 23 is withdrawn.

Either notch 12 is used for the insertion of a tool (not shown), which serves to pry away clamp 10 in case the clasp needs replacement.

What I claim is:

1. A clasp for fixing an electrical wire to a pin-type insulator having an upper saddle portion, comprising: a clamp made of resilient but bendable material and having an upper portion; grasp means at both its two transverse ends to positively grasp said saddle portion; further comprising a gripper element located in said clamp and made of deformable, elastomeric material and having a main body portion; a pair of first walls extending lengthwise and projecting upwardly, one at both transverse ends of said main body portion, said body portion and said first walls contacting said upper portion of said clamp, a pair of second walls also extending lengthwise and projecting downwardly from said main body portion below and contiguous with said first walls; a lengthwise-extending first groove located at the undersurface of said body portion and centrally thereof; a second groove extending lengthwise at the inner lower extremity of each said second wall; said second walls being deformable inwardly to a fully-folded, final configuration under the action of said clamp when grasping said saddle portion, wherein said first groove and both said second grooves define a circular bore adapted to firmly grip an electrical wire therein.

2. A clasp as defined in claim 1, further including attachment means to attach said gripper element to said clamp.

3. A clasp as defined in claim 2, wherein said attachment means consists of a pair of lengthwise-extending, transversely-spaced L-shape flanges secured to the interior surface of said clamp; and a pair of complementary spaced-apart L-shape furrows provided in the top surface of said main body portion of said gripper element and engageable by said L-shaped flanges.

4. A clasp as defined in claim 3, wherein said upper portion forms a pair of spaced-apart, lengthwise-extending, upwardly-projecting ridges.

5. A clasp as defined in claim 1, wherein said saddle portion includes an arcuate transverse cradle and a jutting part at each end thereof, and wherein said grasp means consist of a downwardly-curved portion merging with said upper portion at each end of the latter, and an inwardly-bent flange at the outer end of each said curved portions; both said flanges having an arcuate recess adapted to securely grasp each said jutting part.

6. A clasp as defined in claim 5, wherein each said recess is provided with an outwardly-extending notch adapted for engagement by a tool to remove said clamp when desired.

7. A clasp as defined in claim 1, wherein the outer surface of said second walls has a profile of curvature to fit the arc of curvature of said cradle on both sides thereof, in the final configuration of said second walls.

8. A method of fixation of an electrical wire to an insulator of the type having a saddle portion formed with a central arcuate cradle portion receiving said wire and transverse jutting parts at each end thereof, comprising the following steps:

(a) locating a clasp directly over said saddle portion; said clasp including a clamp having grasp means to grasp said insulator and a pair of spaced-apart lengthwise ridges and made of resilient but bendable material; a wire gripper element having attachment means for attachment to the interior surface of said clamp and being made of deformable elastomeric material, said wire gripper element further having a main body portion and a pair of first transversely-spaced walls upwardly projecting from said main body portion, and a pair of downwardly-projecting second walls, one under each said first wall; a first lengthwise groove provided in the lower surface of said main body portion, a second lengthwise groove made in each lower inner extremity of said second walls;

(b) lifting said wire off said cradle;

(c) forcing said second walls against said cradle to cause inward bending of the same under said lifted wire; and (d) forcing said clamp against said jutting parts to cause said grasp means to grasp said insulator.

9. The method defined in claim 8, wherein the force used in forcing step (d) is directed onto said two ridges to cause transverse bending of the portion of said clamp located between said two ridges.

* * * * *